Jan. 16, 1945.                D. G. ROOS                  2,367,434
                             MOTOR VEHICLE
                          Filed Sept. 17, 1943           4 Sheets-Sheet 2
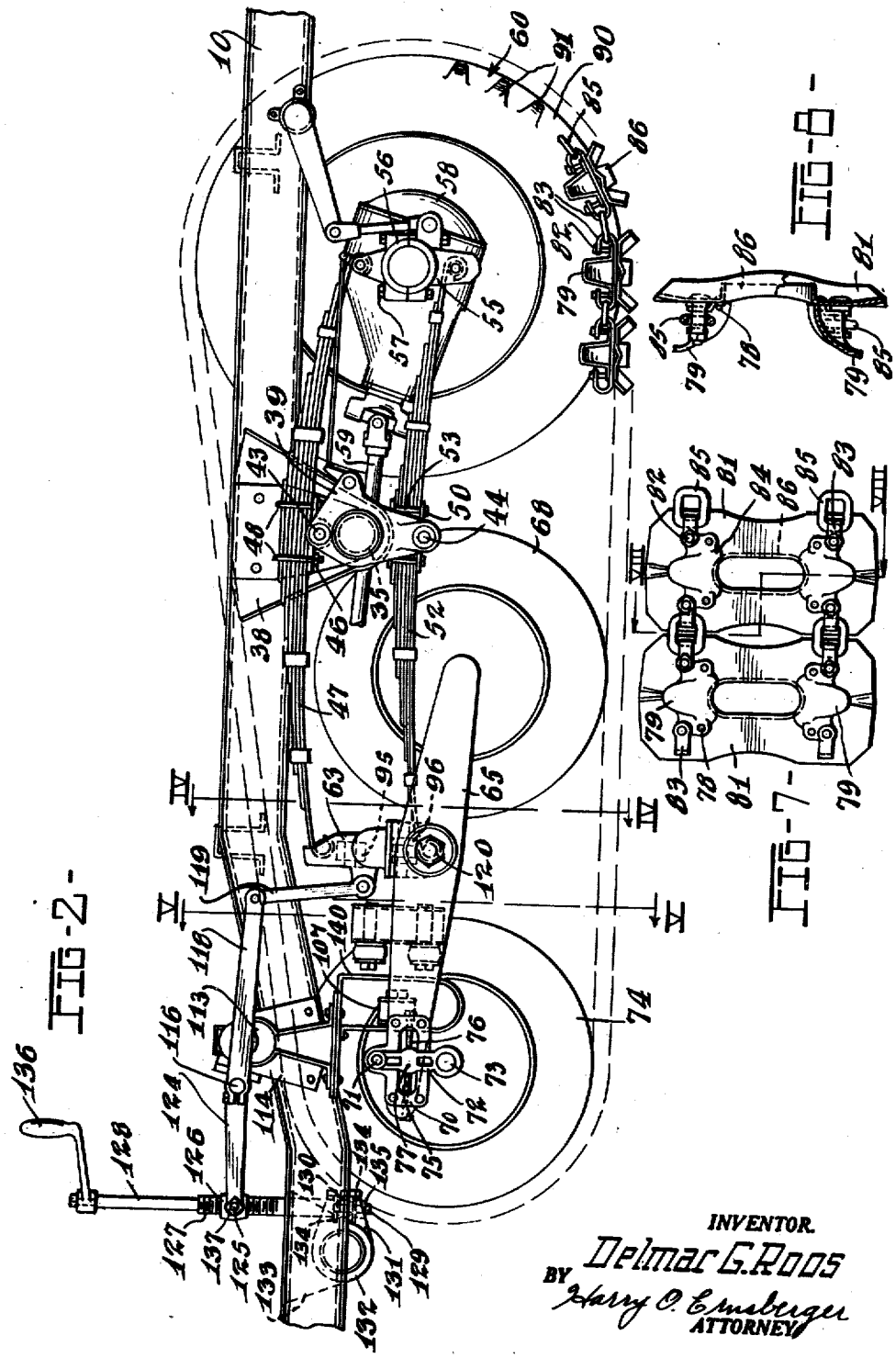
INVENTOR.
Delmar G. Roos
BY Harry C. Emsberger
ATTORNEY

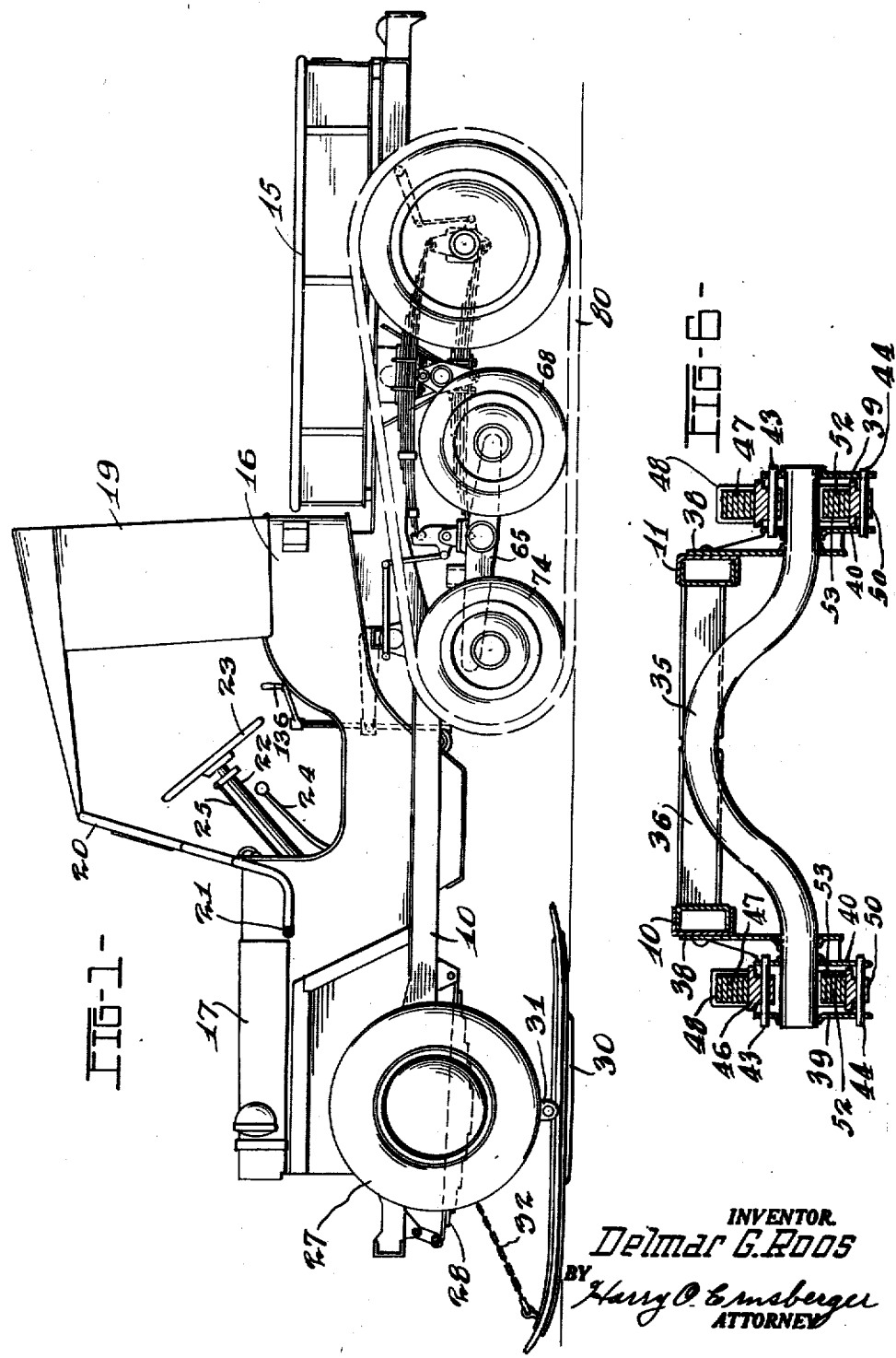

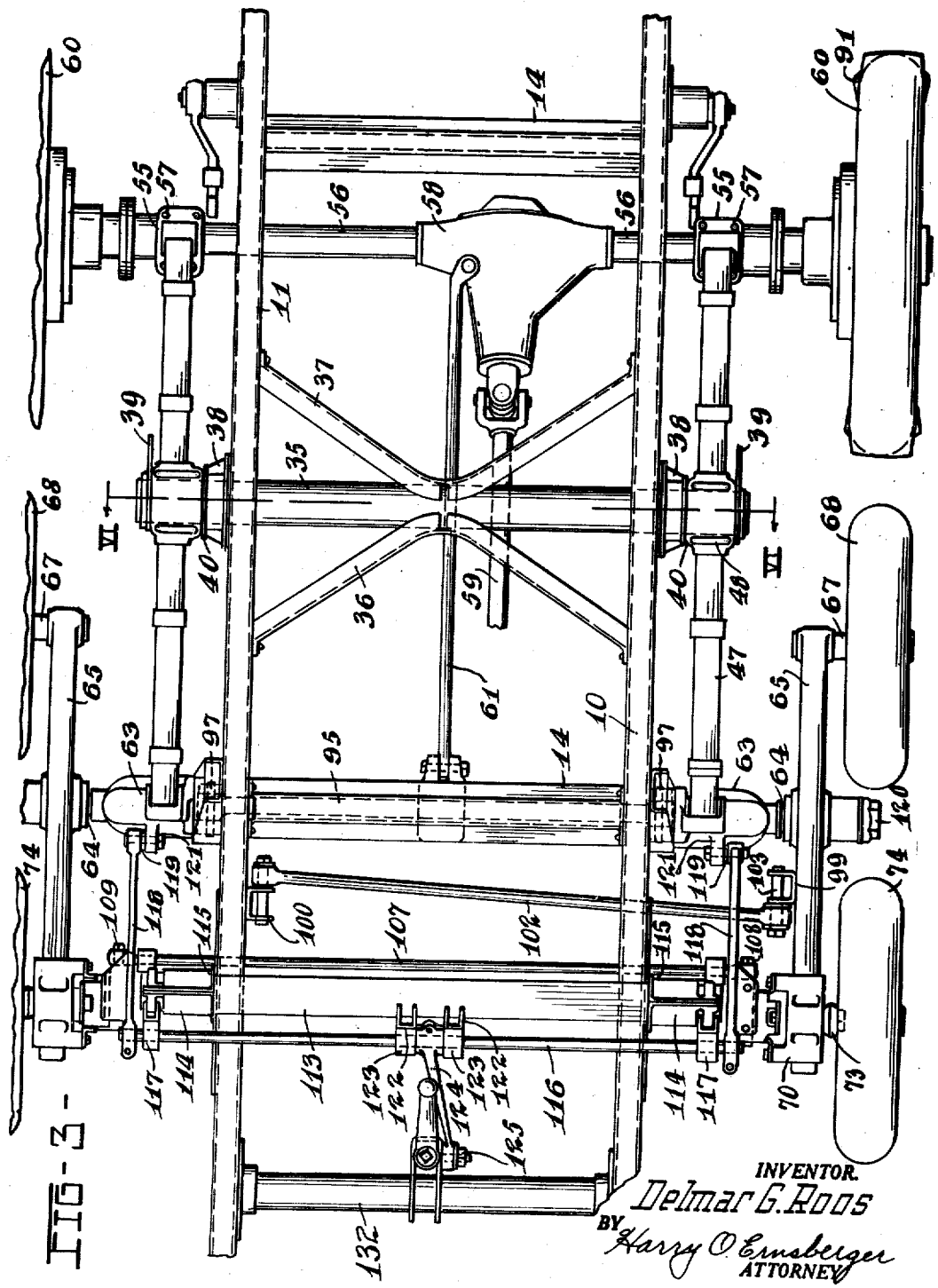

Jan. 16, 1945.  D. G. ROOS  2,367,434
MOTOR VEHICLE
Filed Sept. 17, 1943  4 Sheets-Sheet 4
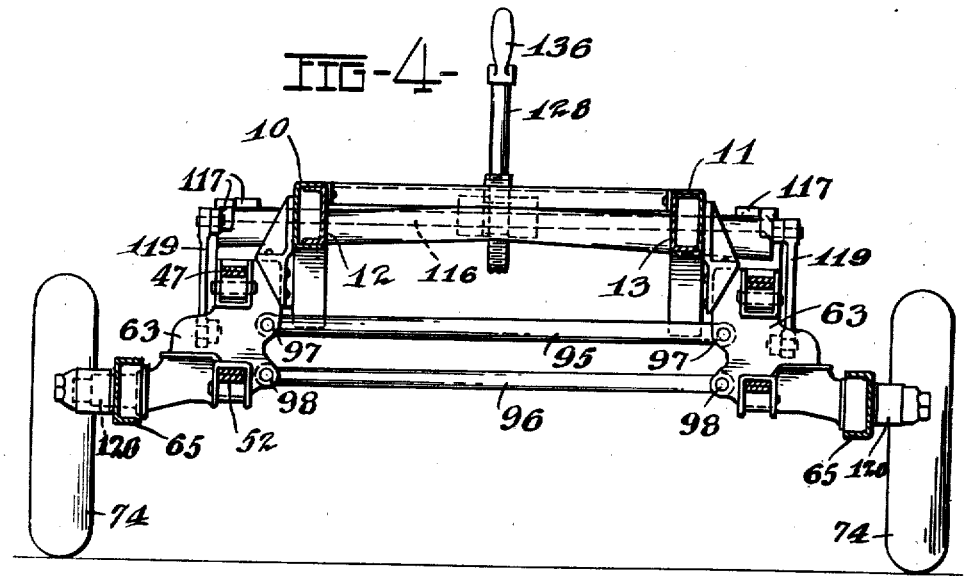
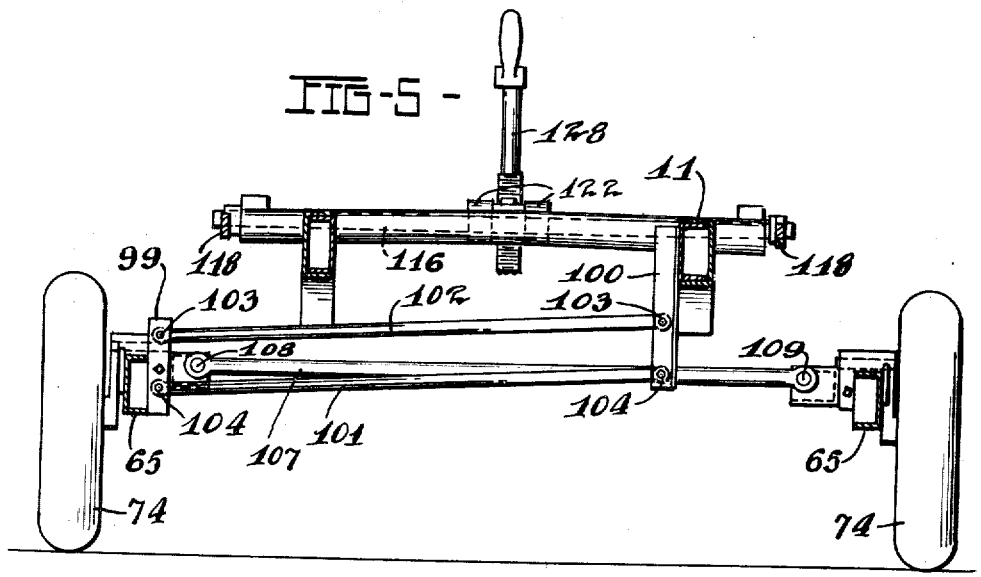
INVENTOR.
Delmar G. Roos
BY Harry O. Ernsberger
ATTORNEY Patented Jan. 16, 1945

2,367,434

UNITED STATES PATENT OFFICE 2,367,434

MOTOR VEHICLE

Delmar G. Roos, Toledo, Ohio, assignor to Willys-Overland Motors, Inc., Toledo, Ohio, a corporation of Delaware Application September 17, 1943, Serial No. 502,841

17 Claims. (Cl. 180—9.1)

This invention relates to automotive vehicles and more especially to vehicles of a character particularly adapted for travel over terrain snow, ice or the like.

The invention comprehends the provision of a vehicle incorporating an endless belt type of traction means of a character presenting a comparatively large area in contact with the supporting surface traversed by the vehicle.

The invention is inclusive of a vehicle arrangement whereby the same may be readily adapted either for travel on highways or on snow and ice or the like.

The invention embraces a vehicle embodying a flexible endless belt type of traction arrangement in combination with means for maintaining the traction arrangement in proper relation with respect to the vehicle frame when the vehicle is traveling over uneven surfaces.

An object of the invention resides in the provision of a linkage arrangement for maintaining the traction means at one side of the vehicle in proper relationship with respect to the traction means arranged at the opposite side of the vehicle irrespective of the unevenness or irregularities of the surface over which the vehicle is traveling.

Another object of the invention is the provision of a vehicle having a flexible belt type traction arrangement so constructed and arranged at each side of the vehicle and inter-connected by means which permits each traction unit freedom of vertical movement independently of the other traction unit.

Still another object resides in the provision of means embodied in a vehicle of the character utilizing a flexible belt traction means for adjusting or controlling a traction guiding means so as to facilitate travel of the vehicle over snow covered terrain.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a side elevational view of a vehicle of my invention;

Figure 2 is a fragmentary side elevational view showing a traction means and supporting arrangement therefore forming a part of my invention;

Figure 3 is a top plan view of the arrangement shown in Figure 2;

Figure 4 is a transverse sectional view taken substantially on the line 4—4 of Figure 2;

Figure 5 is a transverse sectional view taken substantially on the line 5—5 of Figure 2;

Figure 6 is a transverse sectional view taken substantially on the line 6—6 of Figure 3;

Figure 7 is a plan view showing a portion of the traction means and

Figure 8 is a sectional view taken substantially on the line 8—8 of Figure 7.

While I have illustrated a form of my invention as embodied in a vehicle especially adapted for traversing snow or ice covered terrain, and which is readily convertible for use on highways, it is to be understood that I contemplate the use of my invention with any type of vehicle wherein the same may be found to have utility.

Referring to the drawings in detail, the vehicle embodying my invention incorporates an elongated frame structure which is inclusive of a pair of spaced channel shaped members 10 and 11 suitably reinforced by means of a second pair of channel shaped members 12 and 13 in nested relationship therewith, each set of nested members having their juxtaposed portions welded or riveted together, forming parallel box-like sections as particularly shown in Figures 4 and 5. These frame sections are joined together by cross members 14. The frame forms a support for the truck-like body 15 and the passenger carrying body portion 16 as illustrated in Figure 1. The body portion 16 is formed with a forwardly extending hood structure 17 which encloses an engine (not shown) or other suitable source of power. The vehicle operator's compartment is enclosed by a suitable top 19, the forward portion of which is connected to the upper extremity of a windshield 20, the frame supporting the latter being pivotally connected as at 21 to the cowl portion of the body. The operator's compartment is provided with the vehicle controls including steering post 22, steering wheel 23 of conventional construction, a variable speed transmission controlling means 24 and a throttle actuating rod 25.

The front wheels 27 are carried in conventional manner upon an axle (not shown) connected to leaf springs 28 which in turn are carried by the frame members 10 and 11. As the vehicle embodying my invention is especially constructed for traveling over snow and ice, there is provided adjacent the front wheels of the vehicle a pair of skids 30, each skid being arranged adjacent a wheel 27 and connected to the steering mechanism by means of a bracket 31 and a chain 32. The brackets 31 are arranged to be actuated by the steering wheel 23 so that the skids 30 may be turned or are dirigibly arranged so that the vehicle may be steered. The brackets 31 are removably connected to the steering mechanism so that the skids 30 may be removed, permitting the front wheels to support the forward portion of the vehicle in the conventional manner so that the latter may travel on highways and the like.

Extending transversely of the frame construction is a tubular member 35 having a raised central portion to which is welded the struts or brackets 36 and 37, the extremities of the brackets being welded and riveted to the frame members 10 and 11 as shown in Figure 3. The extremities of the tubular member 35 extend laterally beneath the side frame members 10 and 11 and are welded or otherwise fixedly secured to brackets 38 carried by and depending from the frame members 10 and 11. Mounted upon the projecting extremities of tube 35 are sets of plates, each set comprising spaced plates 39 and 40. The plates 39 and 40 of each set are welded or otherwise fixedly secured to the tube 35. As shown in Figure 2, the plates 39 and 40 of each set are provided with alined openings through which extend pivot pins 43 and 44. Positioned between each of the plates 39 and 40 is a spring seat or bracket 46 which is pivotally supported upon the pivot pin 43. Each bracket 46 supports a multi-leaf spring 47 secured thereto by means of U-shaped clamps 48. Arranged below the extremities of tube 35 and positioned between the plates 39 and 40 of each set of brackets 50 pivotally supported upon pivot pins 44. Each of the brackets 50 supports a second leaf spring 52 secured thereto by means of U-shaped clamps 53. It should be noted that each of the leaf spring constructions 47 and 52 arranged at each side of the vehicle are adapted for pivotal movement about the pivot pins 43 and 44.

The rear extremities of each pair of springs 47 and 52 are pivotally joined to brackets or connectors 55, the latter being fabricated in two sections fixedly secured to the rear axle housing 56 by means of bolts 57 or other suitable securing means. The axle housing 56 encloses live axles (not shown) which are driven through a differential mechanism contained within a housing 58 from a propeller shaft 59 connected to the engine (not shown) enclosed by the hood 17. The differential housing 58 is connected to one of the transversely extending frame members 14 by means of a bar or link 61 for the purpose of maintaining the proper relationship between the differential housing and the vehicle frame. The driven axles contained within the housings 56 are operatively connected to driving wheels 60 for actuating the endless belt traction means as hereinafter described.

The forwardly extending extremities of each of the sets of springs 47 and 52 are pivotally connected to members 63 arranged at each side of the vehicle. Each of the members 63 is provided with a laterally extending spindle 64 upon which is journaled a walking beam or member 65. The rearwardly extending extremity of each of the walking beams 65 is provided with a laterally projecting spindle or stub shaft 67 upon which is journaled a guide or idler wheel 68. The forwardly extending extremity of each of the walking beams 65 supports a bracket 70. Each of the brackets 70 is provided with a bolt 71 pivotally supporting a depending arm 72 carrying at its lower end a laterally projecting spindle or stub shaft 73 upon which is journaled a wheel 74. As will be seen from Figure 2 there is arranged at each side of arm 72 adjusting screws 75 and 76 which are threaded into openings in bracket 70, the ends of the screws contacting an intermediate portion 77 of the arm 72. By manipulation of screws 75 and 76, the arm 72 may be oscillated or adjusted about the axis of the bolt 71.

As shown in Figures 7 and 8, each cleat is of generally rectangular configuration and secured thereto by means of rivets 78 are spaced guide members 79. The cleats 81 are provided with openings to receive bolts 82 which secure clevises 83 thereto and guide members 79 are formed with portions 84 having openings to accommodate the bolts 82. Each adjacent pair of clevises 83 are joined together by a chain link 85. In this manner the treads or cleats are articulately connected together forming a flexible traction means suitable for traversing irregular terrain and of a character presenting a large traction surface. In a vehicle of the character illustrated wherein the forward portion is supported by means independent of the belt type traction means the latter is referred to as a half track or half track traction means. The cleats or plates 81 are provided with central openings defined by flanges 86, the flanges adapted to grip the snow or other supporting surface, the openings forming a means to prevent snow and ice from accumulating between the lugs and the supporting wheels. Each driving wheel 60 is provided with a pneumatic tire 90 which is molded with suitable projections 91 on its periphery serving as teeth to engage between the guiding members 79 to drive the traction means 80. Each of the guide or idler wheels 68 and 74 are provided with pneumatic tires which engage the inside of the traction means to hold the latter in proper relation to the surface over which the vehicle is traveling. As illustrated, the tires on wheels 68 and 74 are not provided with driving projections as they simply function to maintain and guide the traction means in proper position.

A vehicle of the character described may encounter exceedingly rough or irregular snow or ice covered terrain and in order to function satisfactorily, the traction means on one side of the vehicle is arranged for vertical movement independently of the traction means on the opposite side of the vehicle. The present invention incorporates means to position the idler wheels in proper relation to the frame of the vehicle and to the drive wheels in order to maintain the endless belt traction means in proper position for functioning irrespective of the irregularity of the supporting surface. To this end the members 63 are joined together so that each will be maintained in a proper vertical position during independent vertical movement of the other. This means consists of a pair of parallel bars or links 95 and 96 which are pivotally joined to members 63 by means of shafts or pins 97 and 98. In order that the walking beams 65 are maintained in proper relation during relative vertical movements thereof, connection is made between one of the beams and the frame of the vehicle. This arrangement is inclusive of a channel shaped member 99 welded or otherwise secured to one of the walking beams 65. Depending from frame member 11 is a channel shaped member 100 which is welded to frame member 11. The channel shaped members 99 and 100 are joined together by means of a pair of parallel links or rods 101 and 102 which are respectively connected to the channel shaped members by means of pins 103 and 104. Thus, through the double link arrangements, the walking beams 65 will at all times be maintained in proper relationship with respect to the vehicle frame. In event that one of the walking beams 65 and its supporting bracket 63 are moved upwardly, the other walking beam will be maintained in proper parallel relationship with respect to it through the connection of rods 95 and 96 arranged between the members 63.

In order to lend stability to the walking beam construction, the brackets 70 adjacent the forward extremities of each of the walking beams 65 are pivotally connected together by means of a rod 107 being pivotally joined to the brackets by means of the bolts 108 and 109, the latter being preferably embedded in rubber or other yieldable material (not shown).

In a vehicle of this character it has been found desirable to provide means for regulating or adjusting the position of the idler wheels governing and guiding the traction means over snow. For this purpose means is provided to regulate or vary the effective downward pressure of the idler wheels with respect to the vehicle frame so that the depth that they may sink into snow may be controlled by the vehicle operator. Extending transversely of the frame members 10 and 11 is a tubular member 113 carried at its ends in sheet metal brackets 114 flanged as at 115, the latter being welded or riveted to the main frame member. The tube 113 is welded to the brackets 114. Extending parallel with tube 113 is a shaft or rod 116 which is mounted in bearings 117 supported upon the sheet metal brackets 114. The shaft 116 projects outwardly beyond the bearings 117 and secured to the projecting extremities are the arms 118. The ends of the arms 118 are pivotally connected to links 119, the latter being pivotally connected by pins 120 to projections 121 integrally formed on the members 63. Welded to the tube 113 is a pair of sheet metal brackets 122 which support bearings 123 serving to support the central portion of shaft 116. Arranged between bearings 123 and secured to shaft 116 is a forwardly extending arm 124. The projecting end of arm 124 is formed with an opening to receive a tenon 125 formed on a nut 126, the latter being threaded upon a threaded portion 127 of a vertically positioned rod 128. The tenon 125 is threaded to receive a nut 137 for retaining the end of the arm 124 upon the tenon. The rod or shaft 128 is formed at its lower end with a tenon 129 passing through an opening in a stub shaft 130, the latter being carried in a bracket 131 welded or otherwise secured to a transversely extending tube 132 which is welded to brackets 133, the latter being riveted or otherwise secured to frame members 10, 11, 12, 13. The tenon portion 129 of shaft 128 is provided with washers 134 positioned above and below the stub shaft 130 serve to maintain and support shaft 128 permitting rotation but restraining vertical movement thereof. A nut 135 is threaded upon the tenon 129 to secure the shaft 128 and washers 134 in proper position with respect to the supporting bracket 131. The upper extremity of shaft 128 is formed with a non-circular portion adapted to receive a manipulating crank 136 for the purpose of imparting rotation to shaft 128.

When it is desired to relieve the pressure upon the forward portions of the traction means, the operator rotates crank 136 to move shaft 128 in a clockwise direction as viewed in Figure 3, which rotation threads the nut 126 downwardly upon the shaft 128 causing counter clockwise movement of arm 124 and shaft 116. This rotation of shaft 116 causes counter clockwise rotation of arms 118 exerting an upward force upon the members 63 through the link connections 119. This action increases the upward pressure upon the forward portions of leaf springs 47 and 52 and correspondingly decreases the downwardly acting force of the idler wheels 68 and 74 so that the pressure on the forward portion of the traction means 80 is decreased and will not, therefore, penetrate into snow as great a distance as it would otherwise do if movement of members 63 were not restrained through the manipulation of shaft 128 and associated mechanism.

In order to limit the independent downward movement of each set of idler wheels, I have provided a U shaped member 140 which extends below the rod 107, the upper portion of the member 140 being fixedly secured to the brackets 114. Thus, if one set of idler wheels moves over a depression, causing them to "fall" a considerable distance, the amount of the "fall" will be limited by engagement of the bight portion of member 140 engaging the rod 107.

In the operation of the vehicle embodying my invention it should be noted that the drive wheels 60 actuate the traction means, the latter being suitably guided into engagement with a supporting surface under the influence of the sets of idler wheels 68 and 74. Through the linkage arrangement as hereinbefore described connecting the members 63, walking beams 65 and the linkage connecting one of the walking beams to the frame structure, the idler wheels are capable of independent vertical movement in respect to the frame to permit the traction means to pass over obstructions and depressions in the terrain or supporting surface yet at all times maintaining the traction means in alinement with the driving wheels of such nature that the traction means will be retained in proper operative engagement with the driving wheels 60 and the forwardly positioned idler wheels 74.

It is apparent that, within the scope of the invention, modifications and different arrangements may be made other than is herein disclosed, and the present disclosure is illustrative merely, the invention comprehending all variations thereof.

What I claim is:

1. An automotive vehicle including a frame, a spring arranged at each side of said frame and carried thereby, means including an axle housing connecting the rearward ends of said springs, axles revolvably mounted in said housing; driving wheels carried by said axles; a walking beam arranged at each side of said frame and carried by the forward extremities of said springs; each of said walking beams supporting a pair of wheels journaled for rotation thereon, traction means associated with said wheels and actuated by the driving wheel, and linkage connecting said walking beams and extending transversely of the vehicle.

2. An automotive vehicle including a frame, a spring arranged at each side of said frame and carried thereby; a pair of driving wheels associated with the rear extremities of said springs; a walking beam arranged at each side of said frame; each beam having means connecting the same to the forward extremities of said springs; each of said walking beams supporting a guide wheel journaled for rotation thereon, traction means associated with said guide and driving wheels and actuated by the driving wheel; means including a pair of links establishing connection between said walking beams and extending transversely of the vehicle; and means pivotally connecting one of said walking beams with said frame.

3. An automotive vehicle including a frame, a walking beam disposed at each side of said frame and arranged in parallel relationship, springs connecting said walking beams to the frame whereby each beam may move vertically independently of the other; a pair of idler wheels journaled on each walking beam, a driving wheel arranged at each side of said frame; half track traction means carried by each set of driving and idler wheels; and means including linkage pivotally connecting said beams together whereby the latter are maintained in parallel relationship during vertical movements thereof.

4. An automotive vehicle including a frame, a walking beam arranged at each side of said frame; springs connecting said beams to the frame; an idler wheel journaled on each walking beam, a driving wheel arranged at each side of said frame, half track traction means carried by each set of driving and idler wheels, linkage pivotally connecting one of said beams to said frame; and linkage extending transversely of said vehicle connecting said walking beams.

5. An automotive vehicle including a frame, a walking beam arranged at each side of said frame in parallel relationship, springs connecting said walking beams to the frame, a pair of idler wheels journaled on each walking beam, a driving wheel disposed at each side of said frame, half track traction means carried by each set of driving and idler wheels, means pivotally connecting one of said beams to said frame; and a pair of links extending transversely of said vehicle and associated with said walking beams whereby the latter are maintained in parallel relationship during independent vertical movement of one of said beams with respect to the other.

6. An automotive vehicle including a frame, a member resiliently carried upon said frame and arranged at each side thereof; a bar journaled upon each member, an idler wheel journaled on each bar, a drive wheel resiliently supported upon said frame at each side thereof, a traction means associated with each set of driving and idler wheels, means including linkage connecting said members; and means connected to said members for varying the downward acting pressure of said idler wheels upon a supporting surface.

7. An automotive vehicle including a frame, members resiliently carried upon said frame arranged at each side thereof; a walking beam journaled upon each of said members, a pair of idler wheels journaled on each walking beam; drive wheels resiliently supported upon said frame at each side thereof; traction means associated with said driving and idler wheels; a pair of links connecting said members together; a pair of links connecting one of said beams to the frame; and manually operated means connected to said members for varying the downward acting pressure of said idler wheels.

8. An automotive vehicle including a frame, a member resiliently carried upon said frame and arranged at each side thereof, a bar journaled upon each of said members; drive wheels resiliently supported upon said frame, an idler wheel journaled on each of said bars, a traction belt associated with each of said driving and idler wheels; means connected to said members for varying the downwardly acting pressure of said idler wheels; and linkage connecting said members whereby said bars are maintained in substantial parallelism during vertical movements thereof.

9. An automotive vehicle including the frame, a pair of springs arranged at each side of said frame and carried thereby, members pivotally connecting the rearward ends of each pair of springs, driving wheels associated with said members, a pair of members each connecting the forward ends of each pair of springs; a walking beam arranged at each side of said frame and carried by a member connecting the forward ends of said springs each of said walking beams supporting a pair of wheels journaled for rotation thereon, traction means associated with said wheels and actuated by the driving wheel, and linkage extending transversely of the vehicle and connecting the members arranged at the forward ends of said springs.

10. An automotive vehicle including the frame, a spring arranged at each side of said frame and carried thereby, members pivotally connecting the rearward ends of said springs, driving wheels arranged adjacent said members, a walking beam arranged at each side of said frame and associated with the forward extremities of said springs; each of said walking beams supporting a pair of wheels journaled for rotation thereon, traction means associated with said wheels and actuated by the driving wheel, a bar connecting said walking beams together; and linkage pivotally connecting one of said walking beams with said frame.

11. An automotive vehicle including a frame, a pair of vertically spaced springs arranged at each side of said frame and carried thereby; members pivotally connecting the forward ends of said sets of springs; driving wheels connected to the rearward extremities of said springs; a walking beam arranged at each side of said frame and pivotally supported by said members; idler wheels carried by and journaled for rotation upon each of said walking beams; a pair of links connecting the members and extending transversely of the vehicle; a rod pivotally connecting one of said walking beams to said frame; and a bar extending transversely of the vehicle and joining said walking beams.

12. An automotive vehicle including a frame, a walking beam arranged at each side of said frame in parallel relationship, springs connecting said walking beams to the frame, a pair of idler wheels journaled on each walking beam, a driving wheel arranged at each side of said frame, half track traction means carried by each set of driving and idler wheels, linkage associated with said walking beams whereby each of said walking beams is arranged for vertical movement independently of the other; and means pivotally connecting one of said walking beams to said frame.

13. An automotive vehicle including a frame, a walking beam arranged at each side of said frame; springs arranged at each side of said frame; members connected to said springs and pivotally supporting said walking beams; wheels journaled upon each of said walking beams; a pair of parallel links pivotally connecting said members whereby vertical movement of one of said beams may be had independently of the other and in substantial parallel relationship; means pivotally connecting one of said walking beams and said frame; and means for varying the vertical acting downward pressure of said wheels upon a supporting surface.

14. An automotive vehicle including a frame, a walking beam arranged at each side of said frame; springs arranged at each side of said frame; members connected to said springs and pivotally supporting said walking beams, wheels journaled upon each of said walking beams; a pair of parallel links pivotally connecting said members whereby vertical movement of one of said beams may be had independently of the other and in substantial parallel relationship; linkage pivotally connecting one of said walking beams and said frame; a bar extending transversely of the vehicle and connecting said walking beams, and manually operated means for varying the vertical acting downward pressure of said wheels upon a supporting surface.

15. An automotive vehicle including a frame, a walking beam arranged at each side of said frame, springs arranged at each side of said frame, members connected to said springs and pivotally supporting said walking beams, wheels journaled upon each of said walking beams, a pair of driving wheels carried by said springs; half track traction means associated with said wheels; a pair of parallel links pivotally connecting said members whereby vertical movement of one of said beams may be had independently of the other and in substantial parallel relationship, a pair of links pivotally connecting one of said walking beams and said frame, a bar extending transversely of the vehicle and connecting said walking beams; and manually operated means for varying the vertical acting downward pressure of said wheels upon a supporting surface.

16. An automotive vehicle including a frame, a walking beam arranged at each side of said frame; springs connecting said walking beams to the frame, an idler wheel journaled on each beam, a driving wheel arranged at each side of said frame, half track traction means carried by each set of driving and idler wheels; means articulately connecting one of said beams to the frame; and means extending transversely of the vehicle articulately connecting said beams.

17. An automotive vehicle including the frame, a spring arranged at each side of said frame and carried thereby, driving wheels disposed at each side of said frame; an idler wheel disposed at each side of said frame; traction means associated with said driving and idler wheels; means supporting said idler wheels and connected to said springs; means articulately connecting said idler wheel supporting means whereby controlled vertical movement of one may be had independently of the other; and means articulately connecting one of said idler wheel supporting means with said frame.

DELMAR G. ROOS.

DISCLAIMER 2,367,434.—*Delmar G. Roos*, Toledo, Ohio. MOTOR VEHICLE. Patent dated Jan. 16, 1945. Disclaimer filed Oct. 12, 1946, by the inventor; the assignee, *Willys-Overland Motors, Inc.*, approving.

Hereby enters this disclaimer to claims 1, 3, 6, 8, and 9 of said patent.

[*Official Gazette November 19, 1946.*]

pair of parallel links pivotally connecting said members whereby vertical movement of one of said beams may be had independently of the other and in substantial parallel relationship; means pivotally connecting one of said walking beams and said frame; and means for varying the vertical acting downward pressure of said wheels upon a supporting surface.

14. An automotive vehicle including a frame, a walking beam arranged at each side of said frame; springs arranged at each side of said frame; members connected to said springs and pivotally supporting said walking beams, wheels journaled upon each of said walking beams; a pair of parallel links pivotally connecting said members whereby vertical movement of one of said beams may be had independently of the other and in substantial parallel relationship; linkage pivotally connecting one of said walking beams and said frame; a bar extending transversely of the vehicle and connecting said walking beams, and manually operated means for varying the vertical acting downward pressure of said wheels upon a supporting surface.

15. An automotive vehicle including a frame, a walking beam arranged at each side of said frame, springs arranged at each side of said frame, members connected to said springs and pivotally supporting said walking beams, wheels journaled upon each of said walking beams, a pair of driving wheels carried by said springs; half track traction means associated with said wheels; a pair of parallel links pivotally connecting said members whereby vertical movement of one of said beams may be had independently of the other and in substantial parallel relationship, a pair of links pivotally connecting one of said walking beams and said frame, a bar extending transversely of the vehicle and connecting said walking beams; and manually operated means for varying the vertical acting downward pressure of said wheels upon a supporting surface.

16. An automotive vehicle including a frame, a walking beam arranged at each side of said frame; springs connecting said walking beams to the frame, an idler wheel journaled on each beam, a driving wheel arranged at each side of said frame, half track traction means carried by each set of driving and idler wheels; means articulately connecting one of said beams to the frame; and means extending transversely of the vehicle articulately connecting said beams.

17. An automotive vehicle including the frame, a spring arranged at each side of said frame and carried thereby, driving wheels disposed at each side of said frame; an idler wheel disposed at each side of said frame; traction means associated with said driving and idler wheels; means supporting said idler wheels and connected to said springs; means articulately connecting said idler wheel supporting means whereby controlled vertical movement of one may be had independently of the other; and means articulately connecting one of said idler wheel supporting means with said frame.

DELMAR G. ROOS.

DISCLAIMER 2,367,434.—*Delmar G. Roos*, Toledo, Ohio. MOTOR VEHICLE. Patent dated Jan. 16, 1945. Disclaimer filed Oct. 12, 1946, by the inventor; the assignee, *Willys-Overland Motors, Inc.*, approving.

Hereby enters this disclaimer to claims 1, 3, 6, 8, and 9 of said patent.

[*Official Gazette November 19, 1946.*]